(12) United States Patent
Johannesson et al.

(10) Patent No.: US 7,236,784 B2
(45) Date of Patent: Jun. 26, 2007

(54) METHOD OF AND SYSTEM FOR SELECTING A PLMN FOR NETWORK SHARING

(75) Inventors: Regina Johannesson, Lund (SE); Christian Herrero Verón, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 11/086,939

(22) Filed: Mar. 22, 2005

(65) Prior Publication Data

US 2005/0215253 A1    Sep. 29, 2005

Related U.S. Application Data

(60) Provisional application No. 60/556,553, filed on Mar. 26, 2004, provisional application No. 60/555,510, filed on Mar. 23, 2004.

(51) Int. Cl.
*H04Q 7/20* (2006.01)
(52) U.S. Cl. ............... 455/435.2; 455/422.1; 455/434; 455/445
(58) Field of Classification Search ............ 455/435.2, 455/422.1, 434, 445, 448, 552.1
See application file for complete search history.

(56) References Cited

U.S. PATENT DOCUMENTS

| | | | |
|---|---|---|---|
| 5,809,416 A | 9/1998 | Pinault et al. | |
| 5,960,356 A | 9/1999 | Alperovich et al. | |
| 6,567,667 B1 * | 5/2003 | Gupta et al. | 455/445 |
| 2003/0040313 A1 * | 2/2003 | Hogan et al. | 455/435 |
| 2003/0129971 A1 * | 7/2003 | Gopikanth | 455/414 |
| 2004/0266438 A1 * | 12/2004 | Bjelland et al. | 455/437 |
| 2005/0075129 A1 * | 4/2005 | Kuchibhotla et al. | 455/552.1 |

FOREIGN PATENT DOCUMENTS

| | | |
|---|---|---|
| EP | 1 263 247 A | 12/2002 |
| EP | 1 353 521 A | 10/2003 |
| WO | WO 03/037022 A | 5/2003 |

OTHER PUBLICATIONS

"Universal Mobile Telecommunications System (UMTS); Non-Access-Stratrum functions related to Mobile Station (MS) in idle mode (3GPP TS 23.122 version 3.90 Release 1999); ETSI TS 123 122" ETSI Standards, European Telecommunications Standards Institute, Sophia-Antipo, FR, vol. 3-CN1, No. V390, Dec. 2002, XP014007767 ISSN: 0000-0001 paragraph 4.4.

* cited by examiner

*Primary Examiner*—George Eng
*Assistant Examiner*—Wesley Kim
(74) *Attorney, Agent, or Firm*—Michael Cameron, Esq.

(57) ABSTRACT

A method for selecting a public land mobile network (PLMN) from a plurality of available PLMNs more particularly, one embodiment of the invention includes the steps of transmitting, via a mobile network, information related to the plurality of available PLMNs. The method further includes the step of receiving, at a mobile station, the information related to the plurality of available PLMNs, and responsive to the step of receiving, sending, to the mobile network, of a Non-Access-Stratum (NAS) signaling message including an identification data for selecting one PLMN from the plurality of available PLMNs. This Abstract is submitted with the understanding that it will not be used to interpret or limit the scope or meaning of the claims, 37 CFR 1.72(b).

8 Claims, 6 Drawing Sheets

METHOD OF AND SYSTEM FOR SELECTING A PLMN FOR NETWORK SHARING

CROSS-REFERENCE TO RELATED APPLICATIONS

This application claims priority from and incorporates by reference the entire disclosure of U.S. Provisional Patent Application No. 60/555,510, which was filed on Mar. 23, 2004. This application further claims priority from and incorporates by reference the entire disclosure of U.S. Provisional Patent Application No. 60/556,553, which was filed on Mar. 26, 2004.

BACKGROUND OF THE INVENTION

1. Technical Field

The present invention relates generally to digital wireless telecommunications and, more particularly, but not by way of limitation, to a method, apparatus and system for selecting, by a mobile station, of a Public Land Mobile Network (PLMN) from a plurality of PLMNs.

2. History of Related Art

One of the most widely-used digital wireless telecommunications standards is the Global System for Mobile communications (GSM) standard, developed by the European Telecommunications Standards Institute. The GSM standard utilizes time division multiple access (TDMA) techniques. A GSM-compliant wireless communication system includes a base station subsystem (BSS). The BSS typically includes a plurality of base transceiver stations (BTSs) for transmitting and receiving radio frequency (RF) signals from a subscriber's mobile station (MS) and at least one base station controller (BSC) for managing radio resource and routing signals to and from the BTSs.

A Universal Mobile Telephone Service (UMTS) standard employs recently developed wide-band code division multiple access (W-CDMA) techniques. A UMTS-compliant system typically comprises a core network (CN) and a UMTS Radio Access Network (URAN) that includes a ground-based portion. The ground-based portion of the radio access network (RAN) is often referred to as the UMTS Terrestrial Radio Access Network (UTRAN) and comprises a radio network controller (RNC) and a base station (BS), which have analogous functionality to the BSC and the BTS of a GSM network, respectively.

A Public Land Mobile Network (PLMN) area is a geographical area in which a particular operator provides mobile communication services to users. From any location within the PLMN area, the user may set up calls to another user of the same mobile network, or to a user of another mobile network. Existing standards require a mobile station (MS) to locate a best possible PLMN for serving the mobile station by measuring signal strengths of Broadcast Control Channels (BCCH) sent by the mobile network. In most current systems, a radio network controller (RNC) or base station controller (BSC) of a mobile network is connected to a single PLMN. Therefore, in such systems, the BCCH channels include information related to the single PLMN. However, in other systems, the RNC/BSC may instead be connected to a plurality of PLMNs. The BCCH channels may, therefore, include information related to the plurality of PLMNs.

SUMMARY OF THE INVENTION

A method for selecting a public land mobile network (PLMN) from a plurality of available PLMNs more particularly, one embodiment of the invention includes the steps of transmitting, via a mobile network, information related to the plurality of available PLMNs. The method further includes the step of receiving, at a mobile station, the information related to the plurality of available PLMNs, and responsive to the step of receiving, sending, to the mobile network, of a Non-Access-Stratum (NAS) signaling message including an identification data for selecting one PLMN from the plurality of available PLMNs.

In another aspect, one embodiment of the invention includes a wireless device for selecting a public land mobile network (PLMN) from a plurality of available PLMNs, the wireless device comprises a wireless receiver for receiving information related to the plurality of available PLMNs from a wireless network and a transmitter for transmitting to the mobile network, of a Non-Access-Stratum (NAS) signaling message including an identification data for selecting one PLMN from the plurality of PLMNs.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein.

DETAILED DESCRIPTION OF EXEMPLARY EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
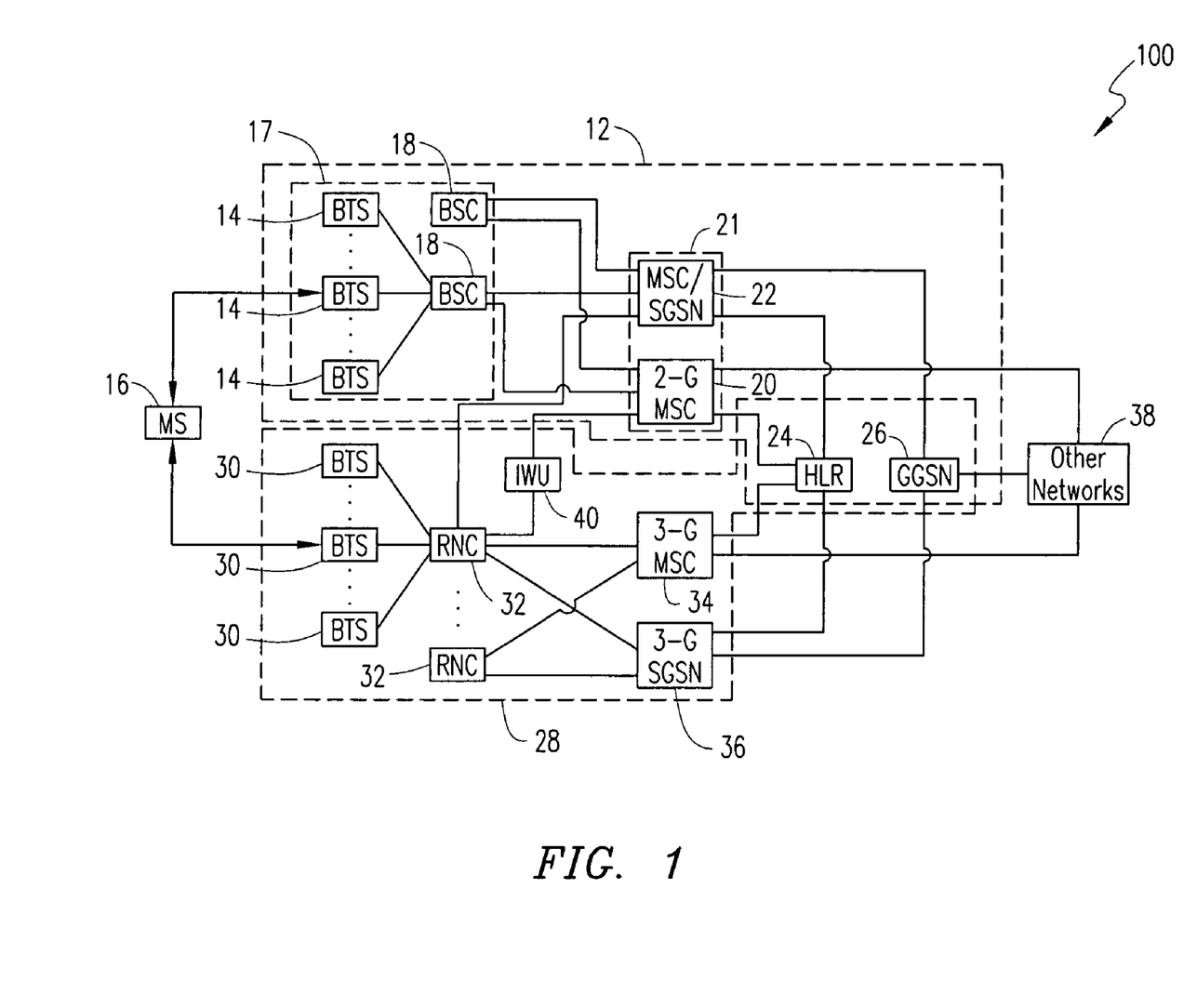
FIG. 1 is a block diagram illustrating a GSM network interfaced with a UMTS network.

FIG. 1 illustrates a wireless telecommunications system 100. The system 100 includes a GSM network 12 having a radio access network portion 17 and a core network portion 21. The radio access network portion comprises a plurality of base transceiver stations (BTSs) 14 for transmitting and receiving voice and data calls from a mobile station (MS) 16, and a base station controller (BSC) 18. The BSC 18 manages radio resources by establishing, maintaining, and releasing communication transactions between the MS 16 and the core network portion. Each BSC 18 is connected to at least one BTS 14 of a plurality of BTSs 14.

The core network portion (e.g., a land-based wireline portion) comprising a mobile switching center (MSC) 20

(e.g. a second-generation or 2-G MSC) for controlling voice calls between the wireless and wireline portions of the network. The core network portion may include another core network node, such as a Serving GPRS Support Node (SGSN) or a MSC/SGSN 22 (i.e. a core network node with SGSN and MSC capabilities). The core network further includes a circuit switched domain for processing, for example, voice calls and a packet switched domain for supporting bursty, high speed data transfers such as, for example, e-mail messages and web browsing.

The packet-switched portion, also known as General Packet Radio Service (GPRS), includes a Serving GPRS Support Node (SGSN), similar to the MSC of the voice-portion of the system, for serving and tracking the MS, and a Gateway GPRS Support Node (GGSN) for establishing connections between packet-switched networks and a mobile station. The SGSN may also contain subscriber data useful for establishing and handing over call connections.

The MSC 20 is coupled to a VLR (not explicitly shown) that temporarily stores the location of the MS 16. Details of the MS 16 will be described with reference to FIG. 3. The MSC 20, and SGSN or MSC/SGSN 22 are connected to a home location register (HLR) 24, which includes a database containing data specific to a subscriber, such as services available to the subscriber and location of the subscriber (i.e., address of the MSC/VLR). The SGSN or MSC/SGSN 22 is also connected to a Gateway GPRS Support Node (GGSN) 26 for accessing other packet networks.

Figure 2:
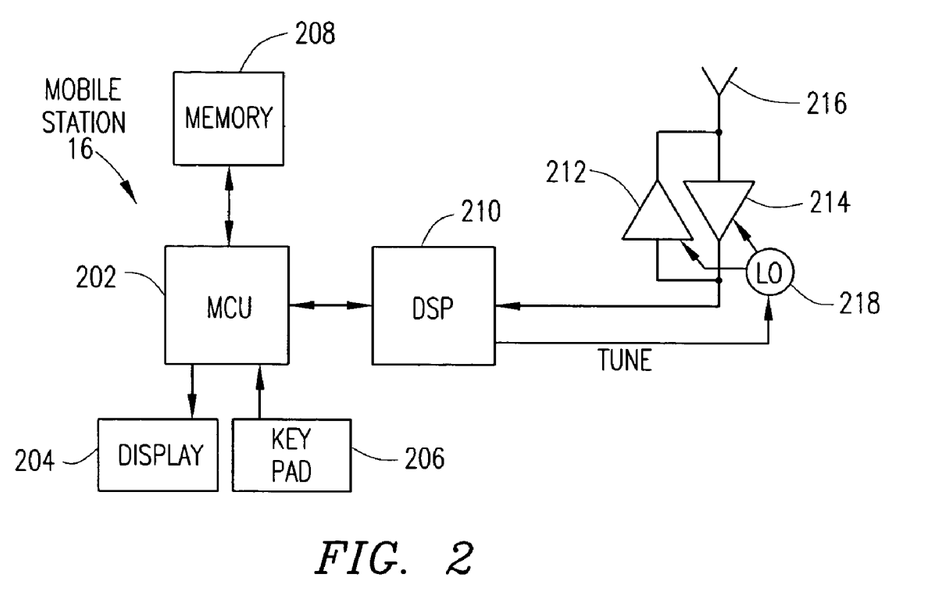
FIG. 2 is a block diagram illustrating a mobile station (MS)

FIG. 2 illustrates a block diagram of the MS 16. The MS 16, for example, may be a handheld radio telephone, such as a cellular telephone or a personal communicator. The MS 16 typically includes a data processor such as a microcontrol unit (MCU) 202 having an output coupled to an input of a display 204 and an input coupled to a keyboard or keypad 206. The MCU 202 is coupled to some type of a memory 208, including a read-only memory (ROM) for storing an operating program, as well as a random access memory (RAM) for temporarily storing required data. A separate removable SIM or USIM (not shown) can be provided as well for storing subscriber-related information.

The ROM of the MS 16 typically stores a program that provides a suitable user interface (UI), via display 204 and keypad 206. Although not shown, a microphone and speaker are typically provided for enabling a user to conduct voice calls in a convenient manner. The MS 16 also contains a wireless section that includes a digital signal processor (DSP) 210, as well as a wireless transceiver that includes a transmitter 212 and a receiver 214, both of which are coupled to an antenna 216. At least one oscillator 218, such as a frequency synthesizer, is provided for tuning the transceiver.

The ROM of the MS 16 stores a program that enables the MS 16 to receive and process handover of the MS 16 from a cell within the GSM network to another cell in the GSM network. The ROM also stores a program to process a inter-system change message which enables the MS 16 from moving from for example, UMTS network to another network, such as a GSM network.

With the introduction of the GSM network, the concept of wireline telephone service has changed drastically. Instead of assigning a telephone number to a particular geographic location, the GSM network teaches an assignment of a telephone number to a particular subscriber. As a result, each subscriber is associated with a Subscriber Identity Module (SIM) card. Using the SIM card, the mobile subscriber is able to store necessary mobile subscriber information in a detachable memory unit and thereafter freely associate a module with any available mobile station (MS) 16. By inserting a mobile subscriber's SIM card into the MS 16, the stored subscriber information in the inserted SIM card is available to the mobile subscriber's new terminal.

A PLMN location area is a geographical area in which a particular PLMN operator provides mobile communication services to the subscriber. Every radio transmitter within the PLMN area broadcasts, via a control channel, a code to identify a location area that the PLMN serves. When the MS 16 is not engaged in a call, the MS 16 automatically scans the broadcast control channels (BCCH) and selects the channel associated with a particular PLMN that is delivering the strongest signal.

In order to make a mobile terminated call, the mobile network, such as, for example the GSM network must know the location of the MS 16 despite of the movement of the MS 16. For this purpose, the MS 16 periodically reports its location to the mobile network using, for example, a Location Updating Request message, an Attach Request message, or a Routing Area Update Request message. In particular, the Location Updating Request message is performed when the MS 16 is, for example, switched off and wants to become active, in an idle state, or after regular intervals.

The Third Generation Partnership Project (3GPP) specification currently specifies network sharing. Network sharing allows operators to share mobile networks. Each operator is identified by a PLMN, so one mobile network may have more than one PLMN. Thus, the broadcast information transmitted on the BCCH from the mobile network to the MS 16 may include information related to a plurality of PLMNs. More specifically, the information may include a PLMN list which may be received by the MS 16 in a plurality of different ways, such as, for example, in a broadcast information or sent directly to the MS 16 through signaling. The MS 16 is required to select one PLMN from the available plurality of PLMNs from the PLMN list. This process of selecting one PLMN from the plurality of available PLMNs is referred to as PLMN selection. In order to make the selection, the MS 16 sends a Non-Access-Stratum (NAS) signaling message to the mobile network which includes an identification data corresponding to a PLMN from the plurality of available PLMNs the MS 16 wishes to connect to (i.e., selected PLMN). The identity data may be, for example, a numerical value.

In GSM, an extension of NAS signaling message to carry the identification data corresponding to the selected PLMN is not possible in the Location Updating Request message. At present, the Location Updating Request message has a maximum length of 18 octets. The NAS signaling message has a maximum length of 20 octets, while the PLMN identification data has a length of 3 octets. Thus, only 2 octets are left, while the PLMN identification data has a length of 3 octets. To overcome the length limitation as, for example, in GSM, a Skip Indicator within the NAS signaling message is utilized to encode a numerical value corresponding to the PLMN the MS 16 desires to connect to. At present, the Skip Indicator provides no function in the NAS signaling message. The Skip Indicator has a length of ½ octet (i.e., 4 bits) and is included in most NAS signaling messages. Thus, by utilizing the 4 bits of the Skip Indicator, PLMN identification data can be encoded. The PLMN identification data corresponds to a number in the range of 0 to 15 to indicate to the mobile network a position (i.e., a numerical identity) of the selected PLMN from the PLMN list. More specifically, the Skip Indicator carries information from the MS 16 to the mobile network with information related to the identity of the selected PLMN from the plurality of PLMNs the MS 16 wishes to connect to. The function of the Skip Indicator as discussed above is one example of various ways in which the Skip Indicator may be utilized, either from the MS 16 to the mobile network or from the mobile network to the MS 16.

Figure 3:
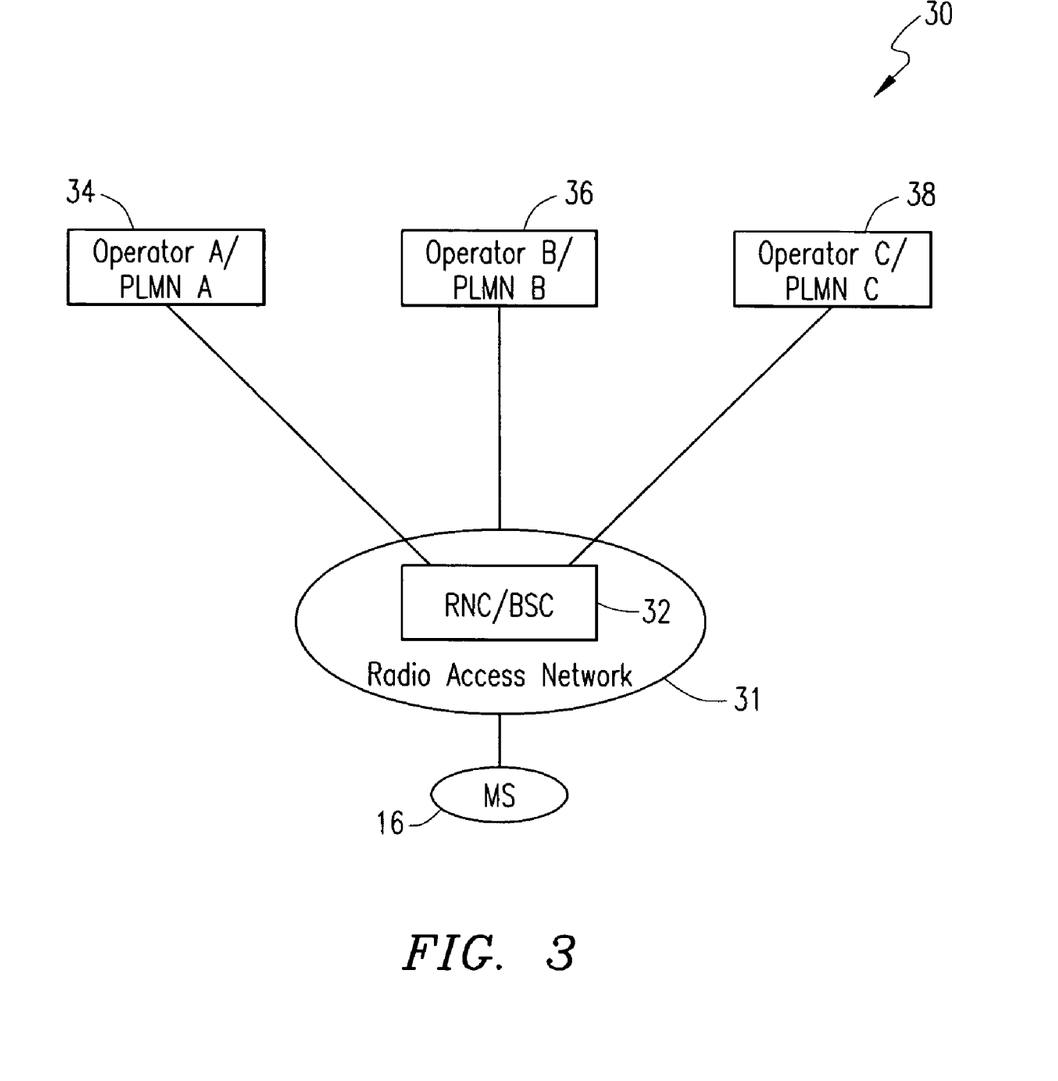
FIG. 3 illustrates an architecture for network sharing according to an embodiment of the present invention.

FIG. 3 illustrates an architecture 30 for network sharing in which only a radio access network (RAN) portion 31 is shared. The radio access network portion 31 comprises a plurality of base transceiver stations (BTSs) (not explicitly shown) for transmitting and receiving voice and data calls from a mobile station (MS) 16, and a controller 32 such as, for example, a radio network controller (RNC) or a base station controller (BSC). A plurality of operators 34, 36, and 38 such as, for example, operator A 34, operator B 36, and operator C 38 are connected to the controller 32 within the RAN 31. The operators 34, 36, and 38 provide mobile communication services to subscribers in geographical areas served by PLMNs. As a result, operator A 34 corresponds to PLMN A, operator B 36 corresponds to PLMN B, and operator C 38 corresponds to PLMN C.

The shared RAN portion 31 transmits a broadcast information on the BCCH to any mobile station within the range of the RAN portion 31 including for example, the MS 16. The broadcast information may include information related to a plurality of PLMNs 34, 36, and 38. More specifically, the broadcast information may include a PLMN list which may be received by the MS 16 in a plurality of different ways, such as, for example, in a broadcast information or sent directly to the MS 16 through signaling.

In another example, the broadcast information may include numerical identification information corresponding to an operator serving a particular PLMN of the plurality of PLMNs 34, 36, and 38. For example, operator A 34 may correspond to numerical value "0", operator B 36 may correspond to numerical value "5", and operator C 38 may correspond to numerical value "7". The MS 16 performs the selection by providing a numerical value that corresponds to the operator serving the associated PLMN. The MS 16 sends a Non-Access-Stratum (NAS) signaling message to the controller 32 which includes identification data (e.g., a numerical value) corresponding to the selected operator from the plurality of available operators the MS 16 wishes to connect to. The MS 16 may indicate the selected operator by a sequential position of the associated PLMN or by a particular numerical value associated with the selected operator.

Figure 4:
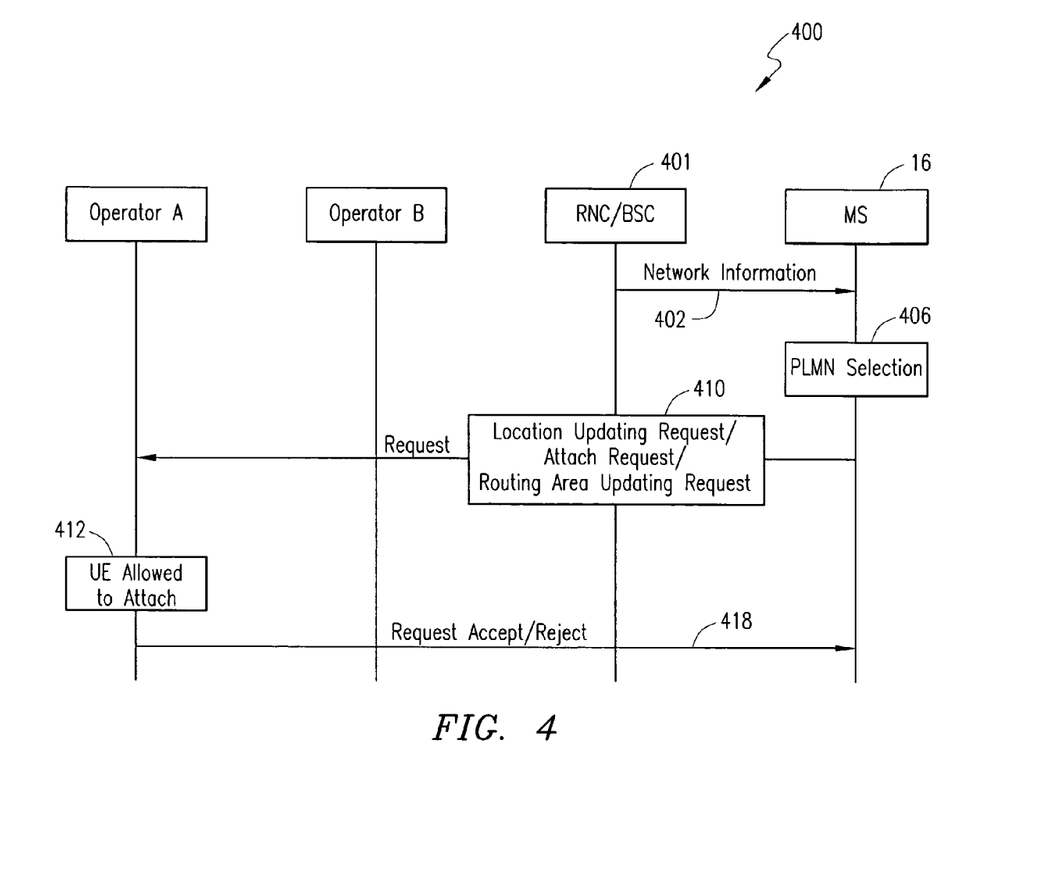
FIG. 4 is a signal flow between the mobile station and the mobile network corresponding to FIG. 3.

FIG. 4 illustrates a signal flow between the MS 16 and the mobile network 401 as discussed with respect to FIG. 3. The mobile network 401 transmits broadcast information (402) to the MS 16, which includes information related to a plurality of PLMNs. More specifically, the broadcast information 402 may include a PLMN list. The MS 16 is required to select one PLMN from the PLMN list. In another approach, instead of transmitting the PLMN list, the mobile network 401 transmits numerical identification information corresponding to an operator serving a particular PLMN of the plurality of PLMNs 34, 36, and 38 together with a PLMN code of the particular PLMN. The MS 16 performs the selection by providing a numerical value that corresponds to the operator serving the associated PLMN. This process of selecting one PLMN from the plurality of available PLMNs is referred to as PLMN selection (406). The MS 16 sends a Non-Access-Stratum (NAS) signaling message to the mobile network 401 (RNC/BSC 401) that includes an identification data corresponding to the selected PLMN from the plurality of available PLMNs the MS 16 wishes to connect to. The identification data is forwarded to the selected operator at step 410. At step 412, the operator may either accept or reject the request. At step 414, an acknowledgement message is transmitted from the mobile network 401 (RNC/BSC) to the MS 16 indicating if the MS 16 selection is accepted or denied.

Figure 5:
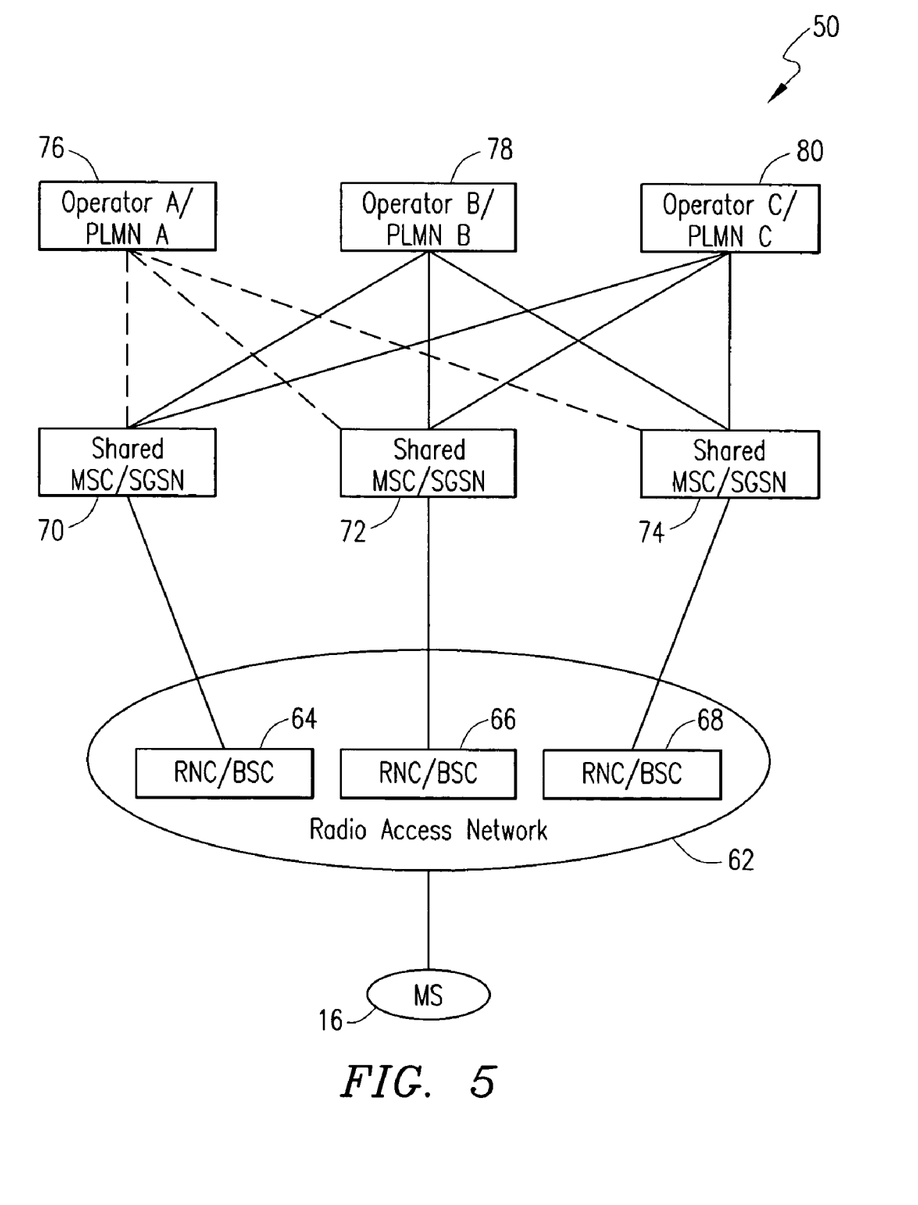
FIG. 5 illustrates an architecture for network sharing according to an alternate embodiment of the present invention.

FIG. 5 illustrates an architecture 50 for network sharing according to another embodiment of the present invention. The radio access network portion 62 comprises a plurality of base transceiver stations (BTSs) (not explicitly shown) for transmitting and receiving voice and data calls from a mobile station (MS) 16, and a plurality of controller 64, 66, and 68 such as, for example, a radio network controller (RNC) or a base station controller (BSC). The architecture 50 further comprises a core network portion including a plurality of nodes 70, 72, and 74 such as, for example, a MSC/SGSN node (i.e. a core network node with SGSN and MSC capabilities). The MSC/SGSN nodes 70, 72, and 74 are connected to the plurality of controllers 64, 66, and 68, respectively. In addition, each one of the plurality of nodes 70, 72, and 74 may be connected to a plurality of operators 76, 78, and 80 such as, for example, operator A 76, operator B 78, and operator C 80.

The RAN portion 62 transmits broadcast information on the BCCH to any mobile station within the range of the RAN portion 62 including, for example, the MS 16. The broadcast information may include information related to a plurality of operators 76, 78, and 80 serving the plurality of PLMNs. The MS 16 decodes the shared network information and transmits a selection information to the MSC/SGSN node 70, 72, and 74 it is connected to. Based upon the selection information, the MSC/SGSN node (70, 72, and 74) connects to one of the plurality of operators 76, 78, and 80, the MS 16 wishes to connect to.

Figure 6:
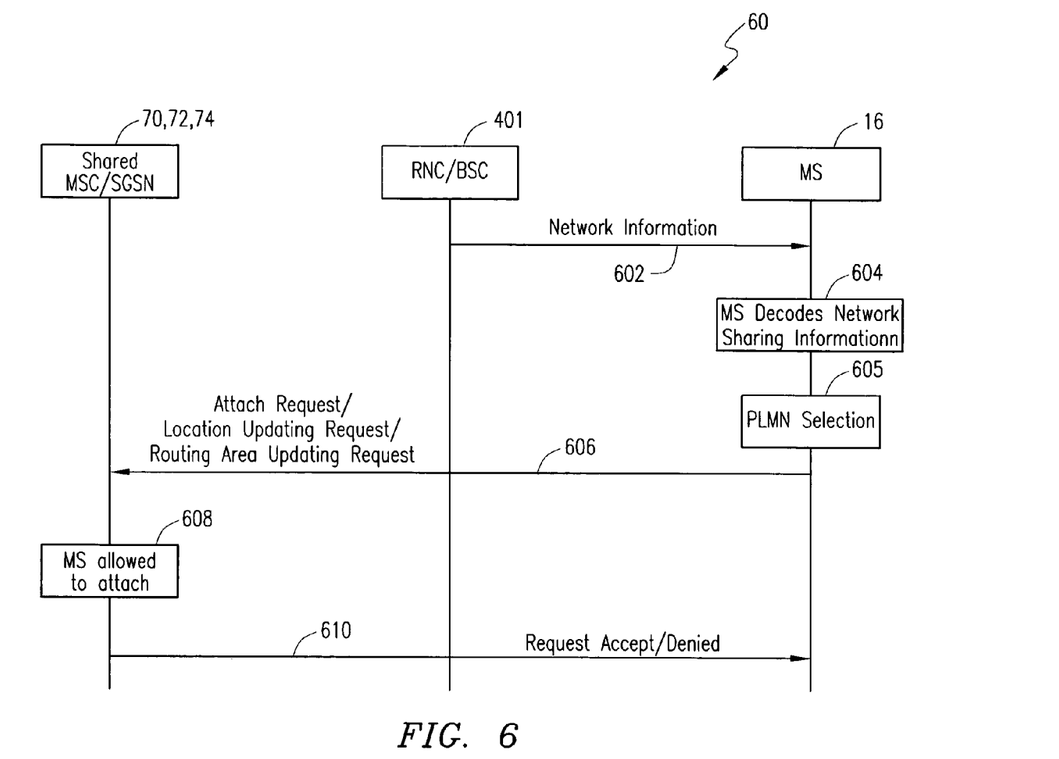
FIG. 6 is a signal flow between the mobile station and the mobile network corresponding to FIG. 5.

FIG. 6 illustrates a signal flow between the MS 16 and the mobile network 601 as discussed with respect to FIG. 5. The mobile network 601 transmits a broadcast information (602) to the MS 16 which includes information related to a plurality of PLMNs. More specifically, the broadcast information 602 may include a PLMN list. The MS 16 is required to select one PLMN from the PLMN list. In another approach, instead of transmitting the PLMN list, the mobile network 601 transmits numerical identification information corresponding to an operator serving a particular PLMN from the plurality of PLMNs 76, 78, and 80. The MS 16 decodes the shared network information at step 604. The MS 16 performs the selection by providing a numerical value that corresponds to the operator serving the associated PLMN. This process of selecting one PLMN from the plurality of available PLMNs is referred to as PLMN selection (605). The MS 16 sends a Non-Access-Stratum (NAS) signaling message to the mobile network 601 which includes an identification data corresponding to the selected PLMN. The identification data is forwarded (step 606) to the at least one of the plurality of MSC/SGSN nodes 70, 72, and 74 which may either accept or reject the request (step 608). At step 610, an acknowledgement message is transmitted from the at least one of the plurality of MSC/SGSN nodes 70, 72, and 74 to the MS 16 indicating if the MS 16 selection is accepted or denied.

Various embodiments of the invention serve to provide provisions for a support of the network sharing features of the selected PLMN. The embodiments further provide a common solution for all of today's system (e.g., GSM, UMTS, GPRS) rather than having different solutions for the different systems. According to the embodiment of the present invention, no new messages or information elements need to be defined.

It should be emphasized that the terms "comprise/comprises/comprising" when used in this specification are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:

1. A method for selecting a public land mobile network (PLMN) from a plurality of available PLMNs, the method comprising:
   transmitting, via a mobile network, information related to said plurality of available PLMNs;
   receiving, at a mobile station, said information related to said plurality of available PLMNs; and
   responsive to said step of receiving, sending, to said mobile network, of a Non-Access-Stratum (NAS) signaling message including an identification data for selecting one PLMN from said plurality of available PLMNs, wherein said identification data is encoded as a numerical value in a Skip Indicator within said NAS signaling message.

2. The method of claim 1, wherein said Skip Indicator comprises a length of 4-bits.

3. The method of claim 1, wherein said identification data includes information related to an identity of said selected PLMN from said plurality of available PLMNs.

4. A wireless device for selecting a public land mobile network (PLMN) from a plurality of available PLMNs comprising:
   a wireless receiver adapted to receive information related to said plurality of available PLMNs from a wireless network; and
   a transmitter for transmitting to said mobile network, of a Non-Access-SLratum (NAS) signaling message including an identification data for selecting one PLMN from said plurality of available PLMNs, wherein said identification data is encoded as a numerical value in a Skip Indicator within said NAS signaling message.

5. The wireless device of claim 4, wherein said Skip Indicator comprises a length of 4-bits.

6. The wireless device of claim 4, wherein said identification data includes information related to an identity of said selected PLMN from said plurality of available PLMNs.

7. The wireless device of claim 4, wherein said information includes a list of said plurality of available PLMNs.

8. The wireless device of claim 4, wherein said wireless device is a mobile station.

* * * * *